United States Patent
Pierce

[11] 3,922,362
[45] Nov. 25, 1975

[54] SHIPPING CONTAINER
[75] Inventor: Frank D. Pierce, Salinas, Calif.
[73] Assignee: Bud Antle, Inc., Salinas, Calif.
[22] Filed: Sept. 22, 1969
[21] Appl. No.: 859,811

[52] U.S. Cl. .................... 426/396; 53/30; 206/497; 229/30; 426/106; 426/415
[51] Int. Cl. ............................................ B65b 53/02
[58] Field of Search ................ 99/171 R, 178, 174; 206/46 FC, 45.33, 80 A, 65 S, 497; 229/30; 53/30; 260/2.5 B; 426/396

[56] References Cited
UNITED STATES PATENTS

| | | | |
|---|---|---|---|
| 2,647,525 | 8/1953 | Duda et al. .......................... 134/63 |
| 2,955,941 | 10/1960 | Hultkrans et al. ..................... 99/171 |
| 3,058,273 | 10/1962 | Forman et al. ....................... 53/30 X |
| 3,156,371 | 11/1964 | Harrison ................. 206/46 FCM X |
| 3,187,477 | 6/1965 | Dreyfus .......................... 206/65 S X |
| 3,255,877 | 6/1966 | Kracht et al. ...................... 206/65 S |
| 3,288,347 | 11/1966 | Commisso et al. .................... 229/30 |
| 3,355,054 | 11/1967 | Wilson .......................... 220/97 D X |
| 3,388,788 | 6/1968 | Hellem .............................. 53/30 X |
| 3,425,543 | 2/1969 | Harvey ......................... 206/45.33 X |
| 3,425,544 | 2/1969 | Ayer et al. ....................... 206/45.33 |
| 3,468,412 | 9/1969 | Forman ......................... 206/45.33 X |
| 3,477,564 | 11/1969 | Crabtree ........................... 206/65 S |

Primary Examiner—Frank W. Lutter
Assistant Examiner—Steven L. Weinstein
Attorney, Agent, or Firm—Thomas H. Olson

[57] ABSTRACT

An overwrapped shipping container in which a stretchable plastic film with a minimum of 50% recovery, or a porus breathing skin of molecularly oriented plastic film, heat shrunk after packing, is applied over a preferably open, but packed expanded polystyrene container to place the entire container under tension from all sides, with no bond between the plastic film and the loaded polystyrene container.

1 Claim, 4 Drawing Figures

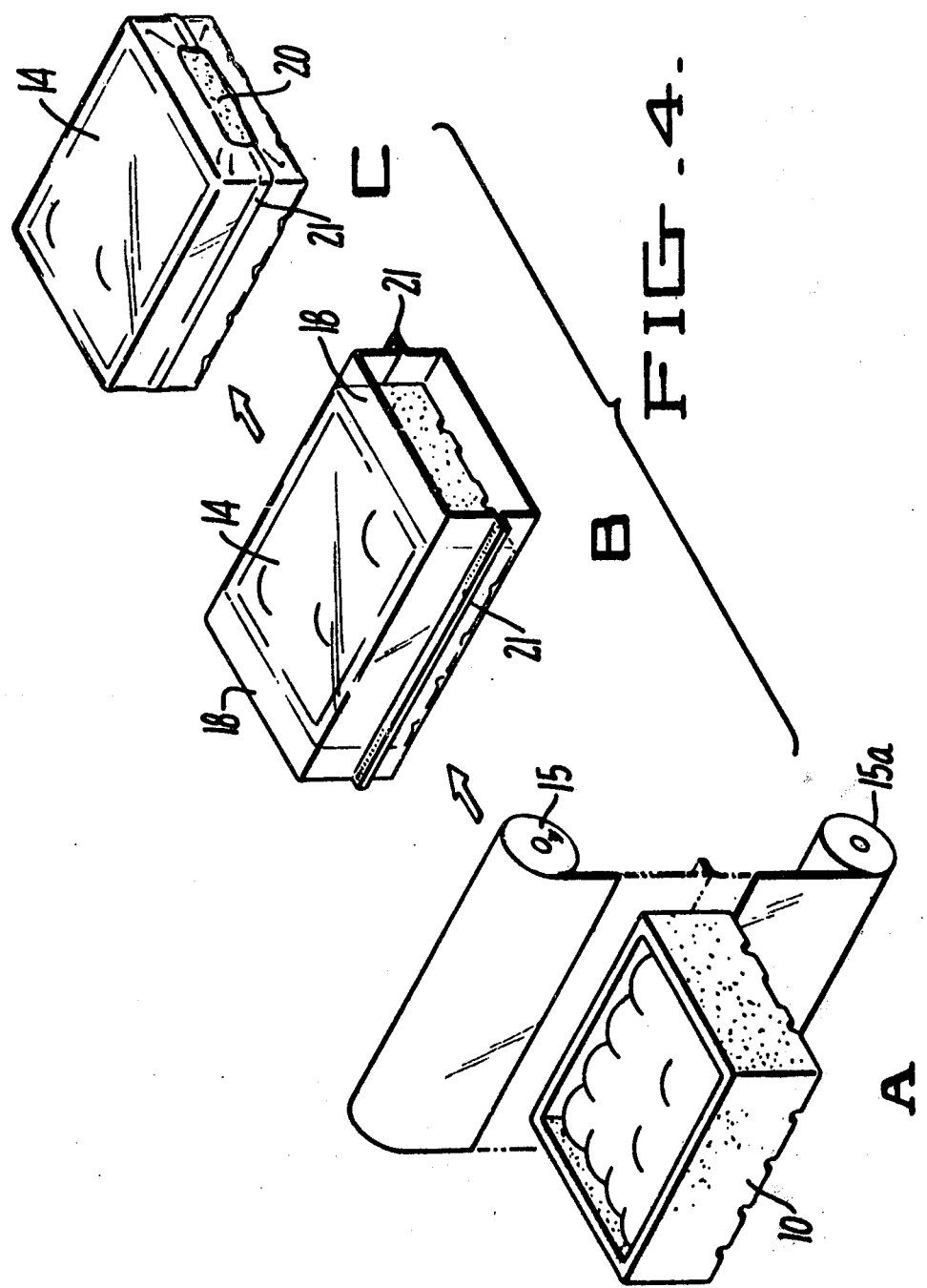

SHIPPING CONTAINER

BACKGROUND OF THE INVENTION

Extensive experiments indicate that expanded polystyrene shipping trays for most fresh fruits and vegetables, herein referred to as produce, are highly desirable from an economic point of view. The cost of the container itself is competitive and its inherent light weight represents great savings in handling and shipping.

Furthermore, extensive shipping tests have established that the expanded polystyrene tray is one of the best means for transporting all sorts of products, but particularly fresh produce. Arrivals at destinations show virtually no damage to the produce and thus costly claims for damage are eliminated as well as the distinct advantage of bringing the produce to the consumer in its pristine condition.

Although the success of the expanded polystyrene trays cannot be disputed, nevertheless a serious problem has arisen in that the expanded polystyrene trays do not have the intrinsic structural strength required for this kind of service. It was found that after the produce had been loaded in the expanded polystyrene trays at the point of origin, where proper care in handling could be supervised, the improper handling and sheer carelessness in the handling destroyed the trays either by pulling the sides or ends out, or by dropping the loaded trays, smashing both the tray and the produce. Numerous ways of strengthening the polystyrene shipping trays were tried and while each had some modicum of success they added further drawbacks which made the entire operation unsatisfactory.

THE PRIOR ART

A preliminary search of the prior art did not disclose any reference of signficant importance. It is known to form containers of expanded plastic with plastic laminated coatings and also to make moisture resistant containers of cellulosic materials coated with plastic film or sprayed with plastic to form a protective coating. This appears to be the limit of the development of the art at the time of this invention.

SUMMARY OF INVENTION

The present invention solves the problems in a very simple and inexpensive manner. The entire tray or container, after being loaded, is wrapped with a plastic film which is then heat-shrunk so that the tension on the film is directed inwardly on the tray in all directions while sealing the produce against any kind of contact from the outside. The overwrapping of the entire tray with film provides a tremendous increase in strength to the container. The expanded polystyrene tray retains and increases the capability of having high cushioning characteristics and reasonably good compression resistance while the tight film overwrap places the entire tray in a condition of compression. This enables the tray to withstand tremendous impact stresses. Trays loaded with 30 to 40 pounds of produce have been dropped from heights of from 5 to 6 feet with no untoward results, no smashing or breaking of the tray and no damage to the produce loaded on the inside. The overwrap does not permit the loading and unloading personnel to pull and break the sides or ends of the tray during the usual violence and carelessness in the handling of the loaded produce.

There are other advantages resulting from this overwrap. An important one is that the sealing of the produce inside by a transparent or translucent plastic film prevents pilferage during transit. Any pilferage during any portion of the transit period, or at any other time, would be noticed immediately because the film would have to be broken.

In most instances it is found advisable to use a film where there is an adequate moisture vapor transmission rate without the use of perforations. The overwrap material used in most instances will accomplish just this.

In addition it is apparent that the loaded produce trays overwrap provides a sanitation barrier preventing insects or other deleterious material from entering the package, making sure that the produce arrives at the destination in its original pristine condition.

The system described is particularly useful because it is intended for field packing and overwrapping, and is well adapted to mechanical handling in the field with mobile equipment. An average of 20 pounds of produce is loaded in containers which are delivered to the ultimate consumer, because this is within the lifting weight limitations of female employees. Larger sizes of course, may be used where handling equipment is available.

Further objects are to provide a construction of maximum simplicity, economy and ease of assembly and disassembly, also such further objects, advantages and capabilities as will fully appear and as are inherently possessed by the device and invention described herein.

The invention further resides in the combination, construction and arrangement of parts illustrated in the accompanying drawing, and while there is shown therein a preferred embodiment thereof, it is to be understood that the same is illustrative of the invention and that the invention is capable of modification and change and comprehends other details of construction without departing from the spirit thereof or the scope of the appended claims.

BRIEF DESCRIPTION OF THE DRAWING

FIG. 4 is a progressive view similar to FIG. 3 but with the sheet material wraped from above and below to form heat seals at both sides, with (A) showing the sheet material above and below ready for application around the loaded tray, (B) heat seals of the two sheets along the longitudinal sides, and (C) the heat-shrunk film around the loaded container as it finally appears.

DESCRIPTION OF PREFERRED EMBODIMENTS

Figure 1:
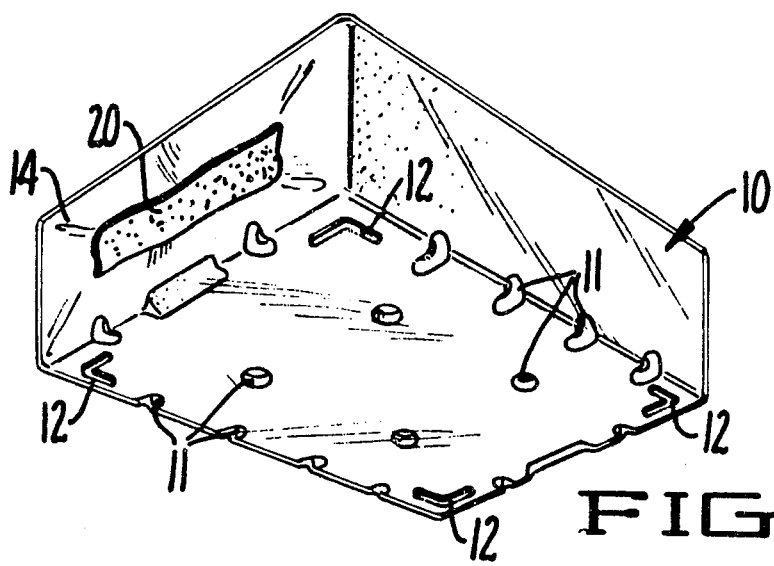
FIG. 1 is a perspective view looking at the underside of the expanded polystyrene tray overwrapped with a transparent plastic film.
Figure 2:
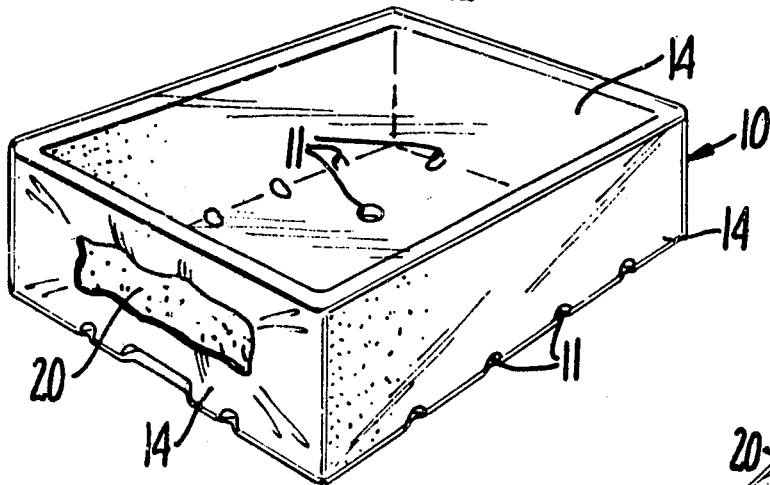
FIG. 2 is a similar perspective view except that the view is looking into the open top of the overwrapped empty tray.

Referring more particularly to the drawings in which like reference numerals indicate like parts in the several views, the expanded polystyrene tray 10 is a molded tray open at the top with integral sides and ends as well as bottom. It has been found that the polystyrene tray should have an approximate density in the range of 1 pound to 2-1/2 pounds. This appears to produce the optimum results of lightness of weight and maximum integrity for the material. The trays are preferably provided with apertures 11 at the juncture of the bottom with all of the walls and in the bottom itself, particularly to aid in processing prior to wrapping. The underside of the bottom is provided with lugs 12 to aid in secure stacking, without damage to the produce in the trays, and without puncturing the overlaying film.

There is a great variety of film material 14 which can be used in the overwrap. Shrink film of either high energy characteristics or low energy characteristics may be used with success. In the case of high energy shrink film the entire shipping tray would be completely overwrapped with film of approximately ¾ to 1-½ mil in thickness and shrunk by the usual heat means. If low energy shrink film such as polyethylene were used as the wrapping plastic, the sheet would be of 1 to 4 mil gauge. Film of the polyolefin family are also used having a specific gravity within the range between 0.885 and 0.965 and having the characteristics of an unrestrained shrink minimum of 35%. The thickness of this film should be between 1 and 6 mils. As will be seen from all of this the film thickness will also be influenced by the weight of the product packaged and the amount of handling that it will be subjected to.

Polyvinyl chloride films and their copolymers are also used and these are high shrink energy films. The characteristics of this group are within a specific gravity range of 1.20 to 1.70. The unrestrained shrink is a minimum of 35 percent. The thickness is from ½ mil to 3 mils gauge.

Heat shrink films may be molecularly oriented in one or two directions, and both successfully used. However, orientation in one direction is all that is required.

It is to be observed that the use of heat shrink film whether oriented in one direction or two directions require the passage of the packed tray through a heat shrink tunnel. The heating even for this brief period could in some instances, alter or damage the produce to the point of making the produce unacceptable to the consumer. I could in some instances, accelerate the processes of decay. While these are special cases, nevertheless heat which could damage the produce is to be avoided, and especially any prolonged heating. It is contemplated therefore, that films suitable for overwrapping include those which are capable of stretching a maximum of 10% at the time of the overwrap, with a recovery minimum of 50%. An example of such films is polyethylene. It is apparent that the same result is accomplished by such films without requiring the passage through a heat shrink tunnel. The film is stretched as the tray is overwrapped and the sides or bottom sealed. The recovery produces the tension in all directions around the tray or carton, and pulls in the ends with a pucker.

Figure 3:
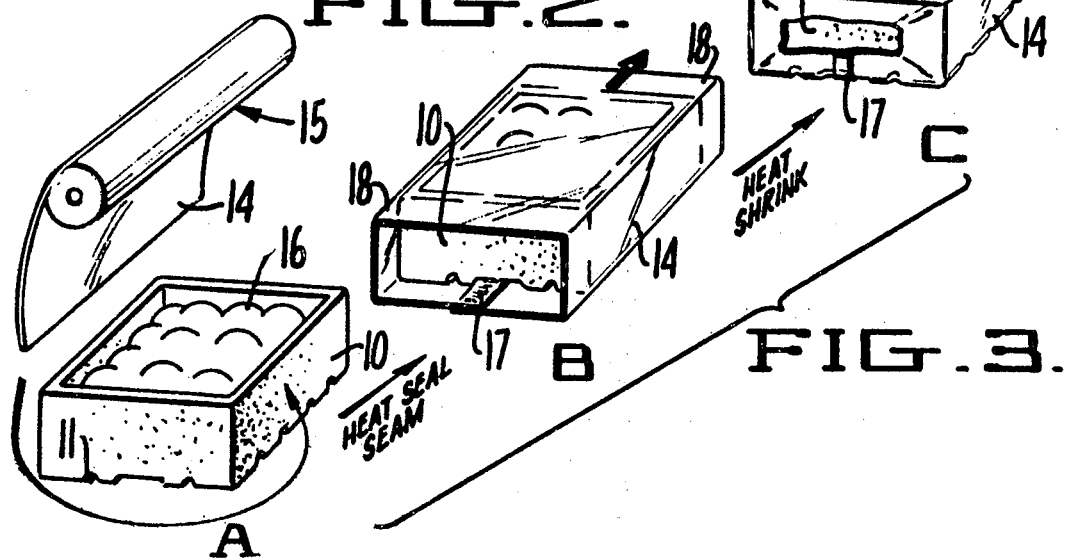
FIG. 3 is a progressive view with (A) showing the sheet material ready for application around the loaded tray, (B) fusing the seam of the sheet around the tray and (C) the heat-shrunk film around the loaded container as it finally appears.

The film in the drawings is represented by the outer covering 14. One satisfactory method of securing this overap is shown in FIG. 3. The roll of heat shrink plastic material 15 is at the Station A in FIG. 3. The expanded polystyrene tray 10 fully packed with produce 16 is brought adjacent to the roll of material 15. The roll of material is wrapped either manually or by machine around the tray 10 and joined with a seam at 17 which is usually a heat seal. This is preferably accomplished at a dwell station as the loaded trays 10 move along their longitudinal axis. The sheet material has a dimension wider than the longitudinal dimension of the tray so that at either end there is an extension or overhang 18. This is represented at Station B in FIG. 3. In this condition the container and its overwrap film passed through a heat shrink tunnel, where heat shrinks the plastic in 2 to 15 seconds with the result shown at Station C in FIG. 3, where the loaded tray is completely sealed in the overwrap. In shrinking, the film 14 pulls in all directions with a substantial tension. Since the overhang of the film 18 is not intended to cover the entire end area, the puckering of the shrinking film leaves an open area 20, which is in no way deleterious. The film is pulled tightly over all of the marginal edges of the tray 10 so that the open tray is effectively sealed against outside contacts. In the use of stretchable plastic the equipment stretches the film and accomplishes the identical result upon recovery, without the use of the heat shrink tunnel.

In FIG. 3, the travel of the loaded trays is in the direction of the longitudinal axis. However, as shown in FIG. 4. the travel can be in the direction of the short or transverse axis. In FIG. 4 there are two film supplies 15 and 15a. At the wrapping station the film sheets are heat sealed as at 21 on the longitudinal sides leaving and overhang 18 as before. This gives the same pucker at the ends with an open area 20. The use of stretchable film accomplishes the identical result. Multiple film supply is here illustrated.

The shrink film referred to generally should have the characteristic of an unrestrained shrink minimum of about 35%. Many of the films have the further characteristic of sufficient porosity to permit breathing or the permitting of moisture vapor to pass therethrough. This is highly desirable in many instances, particularly where retained moisture within the film coverage hastens deterioration and spoilage. In some instances where the film has sufficient integrity, and where the film is non-breathing, it is possible to approximate the optimum results by spaced perforations through the film. It is recognized that while such perforated film does permit the transmission of gas, it is inferior as a sanitation barrier.

While the open top tray is referred to herein, the top of the tray may be closed with a cover before the overwrap. However, to close the tray would lose the esthetic advantage of seeing the produce without danger of damage or contamination. It is also to be observed that there is never at any time a bonding of the film to the container.

This invention has been described in relation to a molded expanded plastic. This is not intended to be a limitation either as to form or materials. For example, an expanded plastic, or other suitable material may be in the form of a flat sheet and folded to form the container, whether the edges thereof are held together independently or only by the overwrap. Likewise the material need not be expanded plastic, so long as the material itself has sufficient integrity so as not to deform significantly under the shrinkage of the overwrap.

It will be observed that this manner of producing a sealed shipping container especially for produce of all kinds has been provided which accomplishes all of the results above indicated and many more.

I claim:

1. The method of bulk packaging produce for shipping to the ultimate consumer, the steps of random packing the produce at the time of harvest in a light weight expanded plastic container having a density of 1 to 2-½ pounds and minimal structural strength said container being open at the top only, wrapping the container with its produce with a stretchable transparent plastic sheeting and stretching the same during the wrapping, said transparent sheeting having a minimum of 10% stretch and 50% recovery, and permitting the plastic sheeting to recover to place the packed container under tension inwardly from all directions without significant distortion of the container and so providing the structural strength for handling, shipping and delivery of the loaded container.

* * * * *